(12) United States Patent
Kawasaki et al.

(10) Patent No.: US 12,382,186 B2
(45) Date of Patent: Aug. 5, 2025

(54) IMAGING APPARATUS HAVING CONTROLLED MOVEMENT OF FOCUS POSITION, CONTROL METHOD FOR IMAGING APPARATUS, AND STORAGE MEDIUM

(71) Applicant: CANON KABUSHIKI KAISHA, Tokyo (JP)

(72) Inventors: Ryo Kawasaki, Kanagawa (JP); Naoki Maruyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 182 days.

(21) Appl. No.: 18/458,904

(22) Filed: Aug. 30, 2023

(65) Prior Publication Data

US 2024/0080575 A1    Mar. 7, 2024

(30) Foreign Application Priority Data

Sep. 2, 2022  (JP) .................. 2022-140388

(51) Int. Cl.
*H04N 23/81* (2023.01)
*G06T 7/00* (2017.01)
*H04N 23/67* (2023.01)
*H04N 23/68* (2023.01)

(52) U.S. Cl.
CPC .......... *H04N 23/81* (2023.01); *G06T 7/0002* (2013.01); *H04N 23/673* (2023.01); *H04N 23/683* (2023.01); *G06T 2207/30168* (2013.01)

(58) Field of Classification Search
None
See application file for complete search history.

(56) References Cited

U.S. PATENT DOCUMENTS

2015/0042866 A1*  2/2015  Wakazono ............ H04N 23/80
                                                                    348/346

FOREIGN PATENT DOCUMENTS

JP    2012004703 A  *  1/2012
JP    2015034869 A      2/2015

OTHER PUBLICATIONS

English translation of JP-2012004703-A, Ariyama, 2012 (Year: 2012).*

* cited by examiner

*Primary Examiner* — James M Hannett
(74) *Attorney, Agent, or Firm* — Canon U.S.A., Inc. IP Division

(57) ABSTRACT

An image capturing apparatus includes an image sensor that captures an image of an object formed by an imaging optical system, at least one processor, and a memory coupled to the at least one processor. The memory stores instructions that, when executed by the at least one processor, cause the at least one processor to execute noise reduction processing on a first image captured by the image sensor based on a plurality of second images, acquire an evaluation value indicating contrast of the first image on which the noise reduction processing has been executed, and control movement of a focus position of the imaging optical system based on the evaluation value. The movement is controlled so that the movement is stopped for a time period having a length corresponding to an intensity of the noise reduction processing in a case where a predetermined condition is satisfied.

17 Claims, 5 Drawing Sheets

IMAGING APPARATUS HAVING CONTROLLED MOVEMENT OF FOCUS POSITION, CONTROL METHOD FOR IMAGING APPARATUS, AND STORAGE MEDIUM

BACKGROUND

Technical Field

One disclosed aspect of the embodiments relates to an imaging apparatus, a control method for the imaging apparatus, a program, and a storage medium.

Description of the Related Art

As digital signal processing to reduce noise in an image, 3-dimensional noise reduction (3DNR) processing of comparing a plurality of continuous frames with each other to detect and remove noise has been conventionally known.

Japanese Patent Application Laid-Open No. 2015-34869 discusses a technique of displaying focus information using an evaluation value stabilized by time filter processing.

As discussed in Japanese Patent Application Laid-Open No. 2015-34869, in a case where autofocus (AF) control to control a focus position of a lens is performed using the evaluation value stabilized by the time filter processing, the evaluation value is smoothed over a plurality of frames. With this configuration, there is a case where a focus position that is shifted from an original in-focus position becomes a peak position (position at which the evaluation value becomes a maximum value), and the in-focus position cannot be detected with high accuracy.

SUMMARY

One aspect of the embodiments is directed to provision of an imaging apparatus that is capable of performing focusing with high accuracy in a case where AF control is performed based on an image subjected to 3DNR processing According to an aspect of the embodiments, an image capturing apparatus includes an image sensor that captures an image of an object formed by an imaging optical system, at least one processor, and a memory coupled to the at least one processor. The memory stores instructions that, when executed by the at least one processor, cause the at least one processor to execute noise reduction processing on a first image captured by the image sensor based on a plurality of second images, acquire an evaluation value indicating contrast of the first image on which the noise reduction processing has been executed, and control movement of a focus position of the imaging optical system based on the evaluation value. The movement of the focus position is controlled so that the movement of the focus position is stopped for a time period having a length corresponding to an intensity of the noise reduction processing in a case where a predetermined condition is satisfied.

Further features of the will become apparent from the following description of exemplary embodiments with reference to the attached drawings.

DESCRIPTION OF THE EMBODIMENTS

An exemplary embodiment for implementing the disclosure will be described in detail below with reference to the accompanying drawings. The exemplary embodiment described below is merely an example of means for implementing the disclosure, and should be modified or changed as appropriate depending on a configuration of an apparatus to which the disclosure is applied and various kinds of conditions, and the disclosure is not limited to the exemplary embodiment to be described below. In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

(Configuration of Apparatus)

Figure 1:
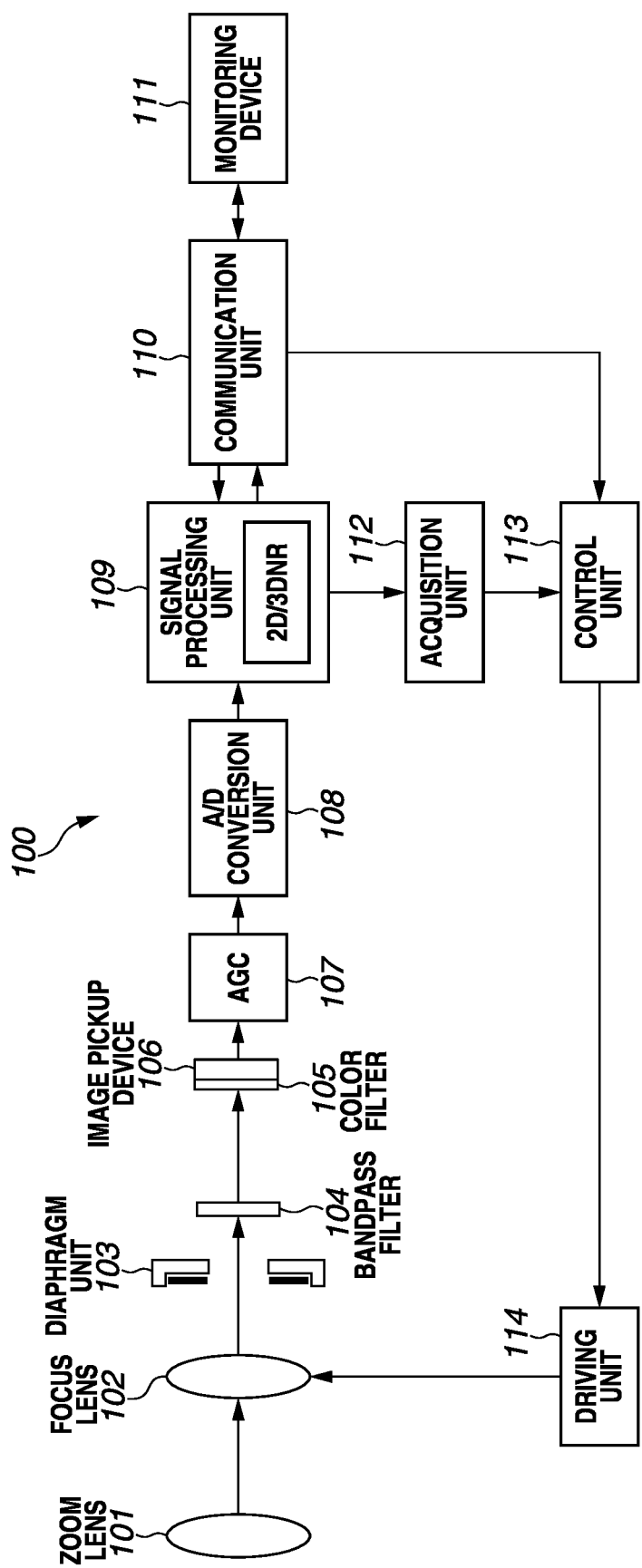
FIG. 1 is a diagram illustrating a configuration of an imaging apparatus according to a first exemplary embodiment.

FIG. 1 is a diagram illustrating a configuration of an imaging apparatus according to a first exemplary embodiment. An imaging apparatus 100 includes a zoom lens 101, a focus lens 102, a diaphragm unit or circuit 103, a bandpass filter 104, a color filter 105, an image pickup device 106, an auto gain control (AGC) 107, an analog/digital (A/D) conversion unit or circuit 108, a signal processing unit or circuit 109, a communication unit or circuit 110, an acquisition unit or circuit 112, a control unit or circuit 113, and a driving unit or circuit 114.

The zoom lens 101, the focus lens 102, and the diaphragm unit 103 are included in an imaging optical system of the imaging apparatus 100. The zoom lens 101 moves in an optical axis direction to change a focal length. The focus lens 102 moves in the optical axis direction to change a point of focus. The diaphragm unit 103 adjusts a quantity of light incident on the image pickup device 106.

Light that passes through the imaging optical system is used to form an image of an object on an imaging plane of the image pickup device 106 via the bandpass filter 104 and the color filter 105. The bandpass filter 104 can be inserted and removed into/from an optical path of the imaging optical system.

The image pickup device 106 is an imaging unit or circuit that captures the image of the object formed by the imaging optical system. Specifically, the image pickup device 106 photoelectrically converts light incident on the image pickup device 106, and outputs the image of the object as an analog electric signal (image signal).

The AGC 107 amplifies the electric signal output from the image pickup device 106 based on a set amplification factor and outputs the electric signal.

The A/D conversion unit 108 converts the analog image signal amplified by the AGC 107 into a digital image signal, and outputs the digital image signal to the signal processing unit 109.

The signal processing unit 109 performs various kinds of image processing on the digital image signal to generate an image (first image). As the image processing, 3-dimensional noise reduction (3DNR) processing to reduce noise included in the digital image signal can be executed. Noise reduction processing using spatial filtering, white balance adjustment, or the like can also be executed. The 3DNR processing mentioned herein is processing of detecting noise included in the digital image signal based on a comparison between signals output from the A/D conversion unit 108 over a plurality of continuous frames, and performing smoothing between the plurality of frames. That is, the 3DNR processing is image processing to reduce noise in the first image based on a plurality of second images. The plurality of second images is preferably images captured before the first image is captured, but the 3DNR processing may be performed using frames previous or subsequent to an image serving as a target of the image processing. With this configuration, noise can be reduced on a pixel-by-pixel basis. A user can freely make a setting about whether the 3DNR processing is executed and a setting about an intensity of the 3DNR processing. The number of frames used for smoothing of the 3DNR processing depends on the set intensity. As the intensity becomes higher, the number of frames to be used increases, whereby a more powerful noise reduction effect can be obtained. Meanwhile, as the intensity becomes higher (that is, the number of the frames to be used becomes larger), there is a case where out-of-focus blur occurs in an image when the image of a moving object is captured, or a case where responsiveness of an evaluation value indicating contrast deteriorates. The term "contrast" here refers to the difference in brightness or luminance in an image. For example, a high-contrast image has regions with bright highlights and regions with dark shadows.

The communication unit 110 is a network interface to output the image generated by the signal processing unit 109 to a monitoring apparatus 111 that is connected by wire, through wireless communication, or the like. The image is not necessarily output to the monitoring apparatus 111, but may be stored in a main storage device such as a memory or an auxiliary storage device such as a hard disk. The main storage device and the auxiliary storage device are not illustrated.

The acquisition unit 112 acquires the evaluation value indicating contrast of an image (third image) generated by the signal processing unit 109. Specifically, the acquisition unit 112 can acquire the evaluation value by generating a specific frequency component (for example, high frequency component) among spatial frequency components of the image as the evaluation value. Assume that the acquisition unit 112 herein acquires the evaluation value of the image (third image) on which the 3DNR processing has been performed by the signal processing unit 109.

The control unit 113 performs AF control based on the evaluation value acquired by the acquisition unit 112.

In a case where focus control is manually performed, the control unit 113 performs focus control based on user's operation information input via the communication unit 110. More specifically, the control unit 113 performs the focus control by performing driving to move the focus position of the focus lens 102 of the imaging optical sys stem in the optical axis direction.

Switching between the AF control and the manual control is also performed based on the user's operation information via the communication unit 110, but may be automatically performed when a predetermined condition is satisfied (for example, temperature focus correction). At least one of a driving velocity of the imaging optical system or the focus position of the imaging optical system is determined by the control unit 113 based on the intensity of the 3DNR processing. The focus control will be described in more detail below.

The driving unit 114 controls the focus lens 102 to move to the focus position instructed by the control unit 113.

(AF Control in Related Art)

Figure 2:
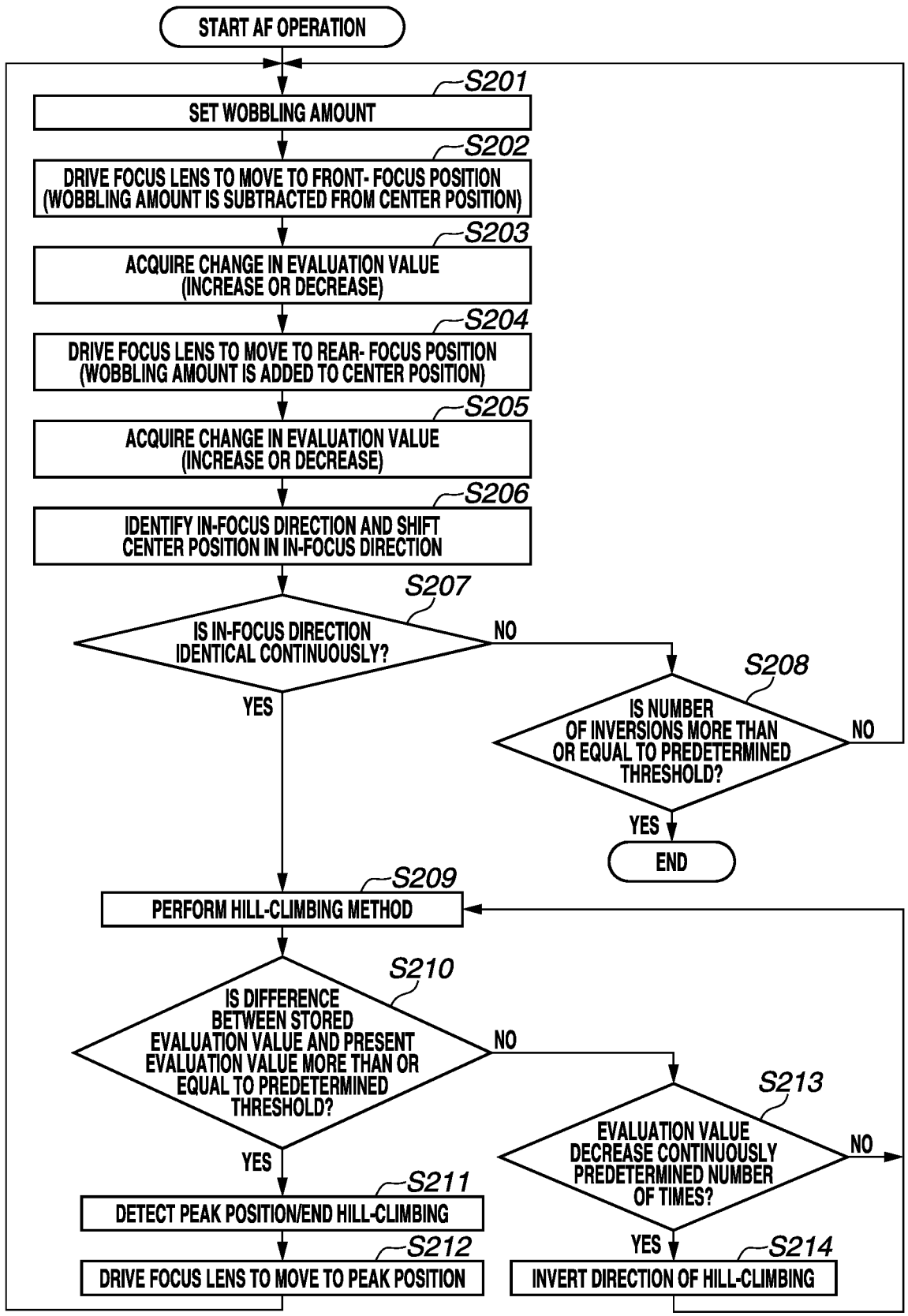
FIG. 2 is a flowchart describing an autofocus (AF) operation performed by an imaging apparatus in related art.

FIG. 2 is a flowchart describing one example of AF control in related art. The AF control by the control unit 113 is executed by a central processing unit (CPU) of the imaging apparatus 100 loading a program stored in a non-volatile storage medium such as a read-only memory (ROM). A hardware configuration of the imaging apparatus 100 will be described below.

The control unit 113 executes the AF control by combining a method of driving the imaging optical system at high speed in a wide range to identify a rough in-focus position (hereinafter referred to as a hill-climbing method) and a method of driving the imaging optical system minutely to identify an accurate in-focus position (hereinafter referred to as a wobbling method).

After the start of an AF operation, the control unit 113 performs the wobbling method. In the wobbling method, the control unit 113 drives the focus lens 102 minutely from a present focus position, and compares evaluation values before and after the driving to identify a direction in which an evaluation value increases. The identified direction is regarded as a direction of the in-focus position when viewed from the focus position (in-focus direction), and the control unit 113 drives the focus lens 102 to move gradually toward the in-focus direction. More specifically, the control unit 113 performs wobbling driving to move the present focus position alternately between a front-focus position (first position) and a rear-focus position (second position) to acquire a change in evaluation value between the front-focus position and the rear-focus position.

In step S201, the control unit 113 sets a wobbling amount depending on a depth. The wobbling amount is typically set to fall within a depth of 1 to make a change in image caused by the focus control less noticeable, but is not limited to this example in a case where the present focus position is not near the in-focus position.

In step S202, the control unit 113 drives the focus lens 102 to move to the front-focus position (first position). In step S203, the control unit 113 acquires a change in evaluation value before and after the driving to the front-focus position (whether the evaluation value increases or decreases). The front-focus position is a position where the wobbling amount is subtracted from a wobbling center position (the present focus position at first).

In step S204, the control unit 113 drives the focus lens 102 to move to the rear-focus position (second position). In step S205, the control unit 113 acquires a change in evaluation value before and after the driving at the rear-focus position (whether the evaluation value increases or decreases). The rear-focus position is a position where the wobbling amount is added to the wobbling center position.

In step S206, the control unit 113 identifies the in-focus direction based on a result of the acquisition of the change in evaluation value before and after the driving to the front-focus position and the change in evaluation value before and after the driving to the rear-focus position. In the identification of the in-focus direction, in a case where the evaluation value after the driving to the front-focus position is larger than that before the driving to the front-focus position and the evaluation value after the driving to the rear-focus position is smaller than that before the driving to the rear-focus position, the control unit 113 identifies a front-focus direction as the in-focus direction. In a case where the change in evaluation value is reversed between the front-focus position and the rear-focus position, a rear-focus direction is identified as the in-focus direction. At the same time, the control unit 113 shifts the wobbling center position to the in-focus direction.

In step S207, the control unit 113 determines whether the in-focus direction is identical continuously. In a case where the in-focus direction is the identical direction continuously (YES in step S207), the processing proceeds to step S209. In step S209, the control unit 113 performs the hill-climbing method. Otherwise (NO in step S207), the processing proceeds to step S208. In step S208, the control unit 113 determines whether the number of inversions, or reversals, of the in-focus direction is more than or equal to a predetermined threshold. In a case where the number of inversions is less than the threshold (NO in step S208), the processing returns to step S201 in which the wobbling method continues to be performed. In a case where the number of inversions is more than or equal to the predetermined threshold (YES in step S208), the focus position is considered to have reached the in-focus position, and thus the AF processing ends.

In the hill-climbing method (in step S209), the control unit 113 drives the focus lens 102 in the in-focus direction at high speed and detects a focus position (peak position) at which the evaluation value becomes a maximum value. In step S210, the control unit 113 stores the evaluation value and the focus position during the driving of the focus lens 102, and determines whether a difference between the stored evaluation value and a predetermined evaluation value is more than or equal to a predetermined threshold. In a case where the difference is more than or equal to the predetermined threshold (YES in step S210), the control unit 113 ends the hill-climbing method and the processing proceeds to step S211. In step S211, the control unit 113 detects the stored focus position as the peak position. In step S212, when detecting the peak position, the control unit 113 drives the focus lens 102 to move to the peak position and the processing returns to step S201. In step S201, the control unit 113 resumes the wobbling method.

In a case where the difference is less than the predetermined threshold (NO in step S210), the processing proceeds to step S213. In step S213, the control unit 113 determines whether the evaluation value decreases continuously a predetermined number of times. In a case where the evaluation value decreases continuously (YES in step S213), the focus lens 102 is considered to be driven in the opposite direction of the in-focus direction, and the processing proceeds to step S214. In step S214, the control unit 113 inverts, or reverses, the direction of hill-climbing, and the processing returns to step S209.

(Relationship Between Evaluation Value and 3DNR Processing)

Figure 3:
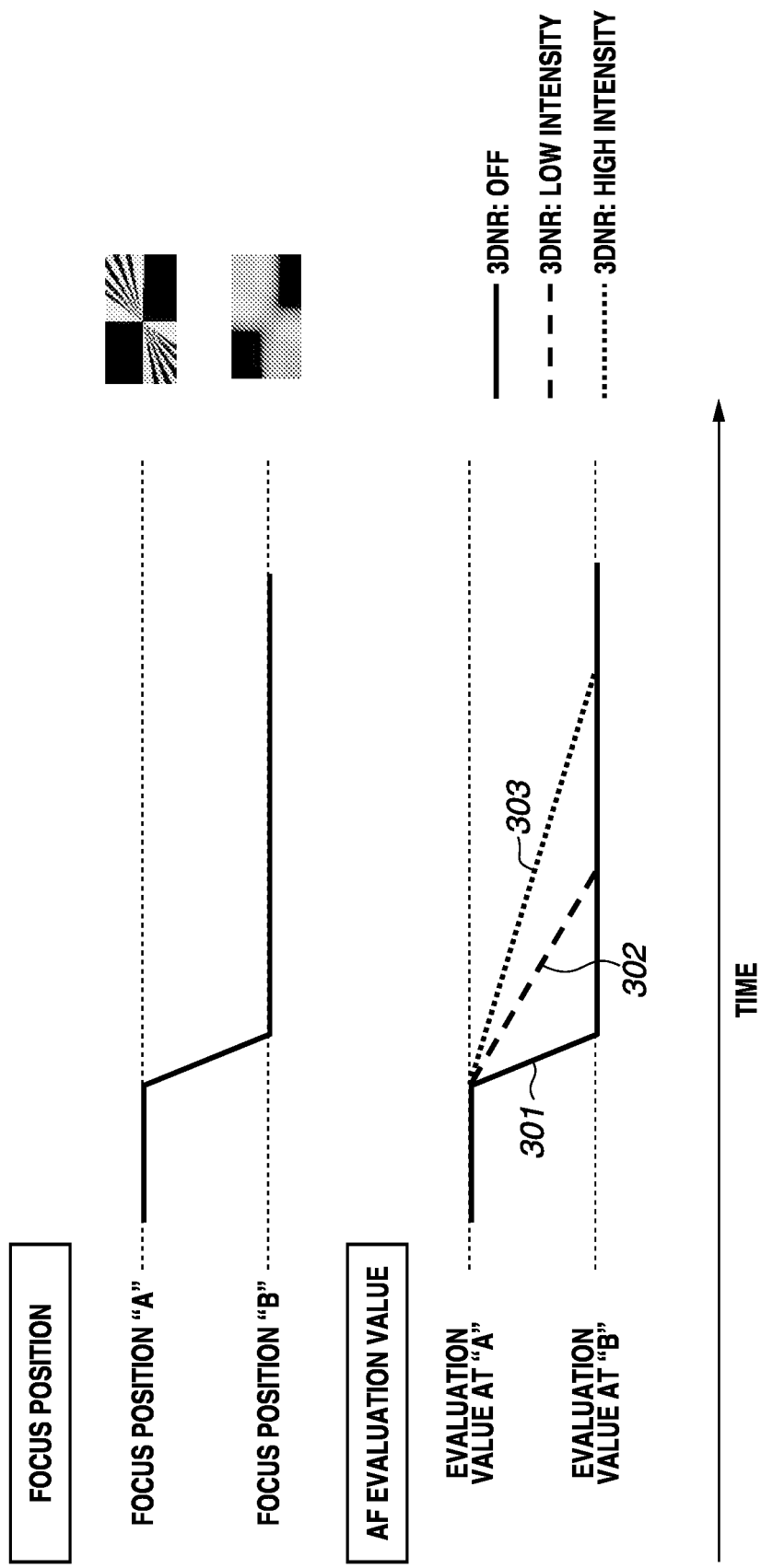
FIG. 3 is a diagram illustrating a relationship between an AF evaluation value and 3-dimensional noise reduction (3DNR).

FIG. 3 illustrates a transition of the evaluation value in a case where the focus position of the imaging optical system (focus lens 102) is moved from a focus position A to a focus position B with respect to each intensity of the 3DNR processing (OFF/low/high). Assume that the focus position A is the in-focus position, and the focus position B is an out-of-focus position. FIG. 3 illustrates that the evaluation value decreases from an evaluation value A to an evaluation value B as the focus position of the imaging optical system is moved from the focus position A to the focus position B.

A graph 301 indicates a transition of the evaluation value in a case where the intensity of the 3DNR processing is OFF, that is, in a case where the 3DNR processing is not performed. In a case where the 3DNR processing is not performed, the evaluation value is not influenced by a previous frame, and thus converges to the evaluation value B immediately after the focus position reaches the focus position B.

A graph 302 indicates the evaluation value when the intensity of the 3DNR processing is low. A graph 303 indicates the evaluation value when the intensity of the 3DNR processing is high. In a case where the 3DNR processing is performed, the evaluation value in the present frame is influenced by the previous frame. Thus, even when the focus position of the imaging optical system reaches the focus position B, a time period until the evaluation value converges to the evaluation value B becomes longer than that in a case where the 3DNR processing is not performed. The time period until the evaluation value converges to the evaluation value B becomes longer as the intensity of the 3DNR processing becomes higher (that is, the number of previous frames used for noise reduction becomes larger). The time period until the convergence of the evaluation value to the evaluation value B becoming longer causes three issues.

The first issue relates to inversion of a direction of the hill-climbing method. When the focus position of the imaging optical system is moved in the opposite direction of the in-focus direction, the inversion of the direction is normally performed. However, when the 3DNR processing is performed and the focus position of the imaging optical system is moved in the opposite direction of the in-focus direction, there is a case where the evaluation value is influenced by acquired frames. As a result, there is a possibility that the evaluation value decreases continuously for a predetermined time period even after the inversion of the direction and thus the direction is repeatedly inversed.

The second issue relates to the time of the shift from the hill-climbing method to the wobbling method. Consideration is given to a case where the focus position of the imaging optical system is moved to the peak position detected by the hill-climbing method, and the shift from the hill-climbing method to the wobbling method is made. In a case where the 3DNR processing is performed, the evaluation value is influenced by evaluation values acquired from frames in which images are captured while the focus position is moved to the peak position detected by the hill-climbing method. Specifically, the 3DNR processing is performed in frames acquired immediately after the shift is made to the wobbling method and frames acquired before the shift is made to the wobbling method. In this case, the AF evaluation value increases continuously for a predetermined time period even after the shift is made to the wobbling. As a result, there is a case where the determination about the direction cannot be made correctly.

The third issue relates to the wobbling method. In the wobbling method, the evaluation value is acquired after the focus position reaches the front-focus position or the rear-focus position. In a case where the 3DNR processing is performed, there is a possibility that frames acquired before the focus position reaches the front-focus position or the rear-focus position are used in the 3DNR processing. In this case, in a case where the evaluation value is acquired from the image on which the 3DNR processing has been performed, there is a case where a change in evaluation value becomes harder to be detected. This is because respective evaluation values acquired before and after the focus position reaches the front-focus position or the rear-focus position are virtually smoothed. The change in evaluation value becoming harder to be detected may cause a case where the accuracy in determination in the in-focus direction deteriorates.

To solve these issues, the control unit 113 of the imaging apparatus 100 according to the present exemplary embodiment stops the movement of the focus position at a predetermined timing for a predetermined time period. More specifically, the control unit 113 performs control to stop the movement of the focus position for the predetermined time period corresponding to the intensity of the 3DNR processing.

The time period to stop (predetermined time period) is set to be longer as the intensity of the 3DNR processing becomes higher (as the number of the previous frames used for noise reduction becomes larger). The predetermined timing is at least one of a timing when the focus position reaches a target position, a timing when the target position is changed, or the driving direction to move the focus position is inverted or reversed. More specifically, the predetermined timing includes a timing when the focus position reaches the front-focus position or the rear-focus position in the wobbling method, and a timing when the focus position is shifted from the present focus position (that is, the wobbling center position) to a predetermined target position in the in-focus direction. Other examples of the predetermined timing include a timing when the shift is made from the hill-climbing method to the wobbling method, and a timing when the driving direction in the hill-climbing method is inverted. In this manner, the execution of the control of the focus position is triggered by at least one of (a) the focus position having reached the target position, (b) the target position having been changed, or (c) the driving direction to move the focus position having been inverted. In other words, in a case where a predetermined condition (at least one of (a), (b), or (c)) is satisfied, the movement of the focus position is controlled to stop for a time period having a length corresponding to the intensity of the 3DNR processing.

In the wobbling method, in a case where the above-mentioned time period to stop the movement of the focus position is set, the movement of the focus position is stopped at both of the front-focus position and the rear-focus position, and thus there is a possibility that a time period taken for the AF control becomes longer than usual. To address this issue, the control unit 113 of the imaging apparatus 100 according to the present exemplary embodiment increases a driving amount in the wobbling by a predetermined amount. The driving amount in the wobbling is an amount of driving to move the focus position from the present focus position (reference position) to the front-focus position or the rear-focus position. Hence, a distance between the front-focus position and the rear-focus position becomes larger as the driving amount in the wobbling increases, whereby the change in evaluation value to be acquired (whether the evaluation value increases or decreases) becomes easier to be detected. The predetermined amount is set so that the predetermined amount is increased as the intensity of the 3DNR processing becomes higher. Generally, a change in focus position becomes larger as the driving amount in the wobbling is increased. Thus, there is a possibility that image quality degrades. In a case where the 3DNR processing is performed, however, out-of-focus blur or motion blur in an image due to a high-speed change in point of focus by the wobbling is smoothed by time filter processing, whereby the degradation of image quality can be prevented.

Both or either of the above-mentioned two methods (the method of stopping the movement of the focus position at the predetermined timing for the predetermined time period and the method of increasing the driving amount in the wobbling) may be executed.

(Description about Operation)

Figure 4:
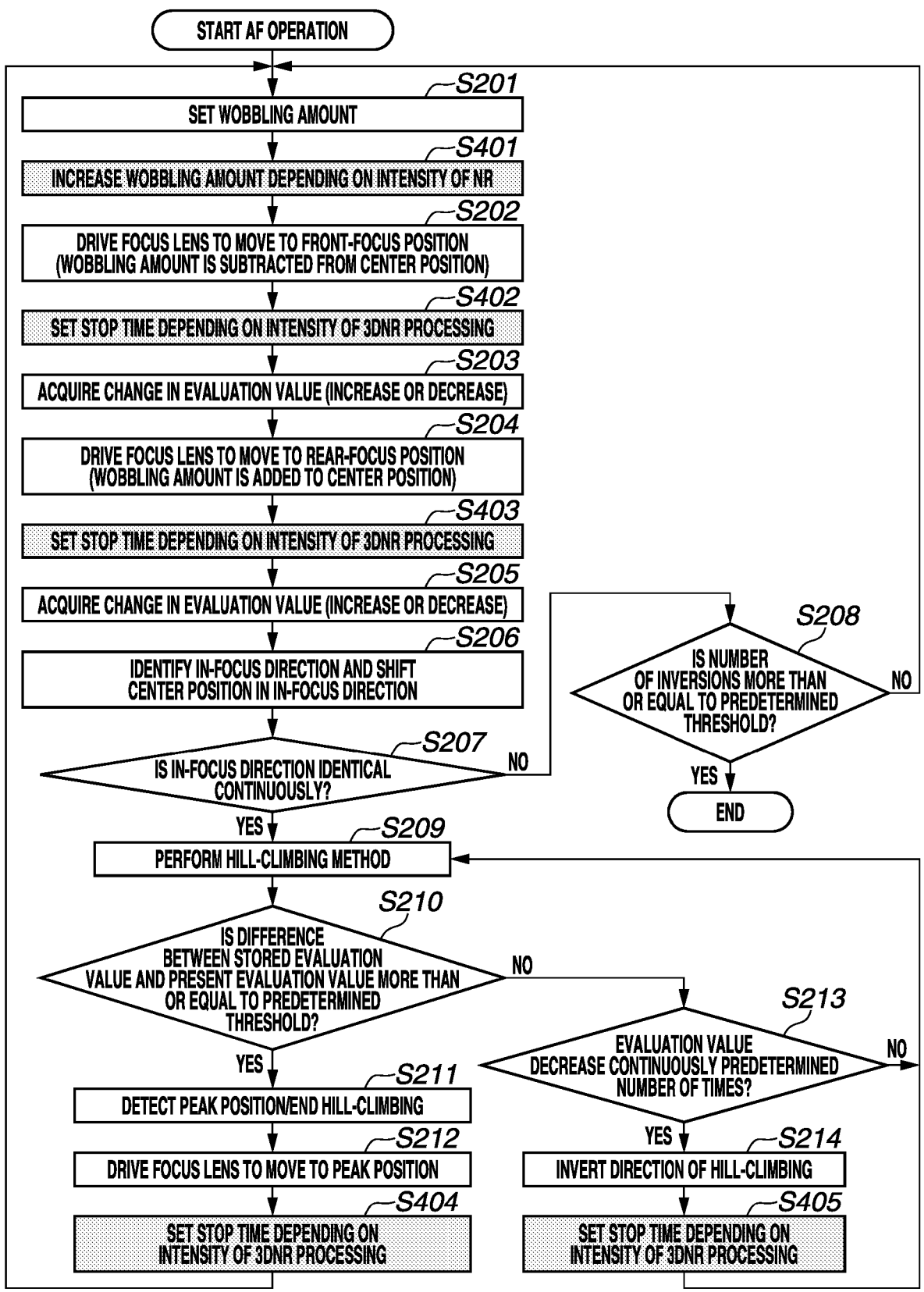
FIG. 4 is a flowchart describing an AF operation of the imaging apparatus according to the first exemplary embodiment.

FIG. 4 is a flowchart describing an example of the AF operation of the imaging apparatus 100 according to the present exemplary embodiment. The operation in the flowchart is an operation executed by the CPU of the imaging apparatus 100 loading a program from the ROM. A step similar to that in the AF operation described above is denoted by an identical reference sign and a description thereof is omitted.

In step S401, the control unit 113 performs processing to increase the wobbling amount set in step S201 by a predetermined amount depending on the intensity of the 3DNR processing. The control unit 113 acquires the intensity of the 3DNR processing based on a setting value set by the user (for example, OFF/low/high), an internal setting value set inside the imaging apparatus 100, a noise amount detected or estimated from an output image, the number of frames used in the 3DNR processing, or the like. The driving amount in the wobbling is increased as the intensity of the 3DNR processing becomes higher, as described above. For example, a magnification ratio or an increased amount may be roughly set based on table data depending on the setting value set by the user, or a magnification ratio or an increased amount may be calculated from the setting value, the number of frames used in the 3DNR processing, or the like.

In step S402 after moving the focus position of the imaging optical system (focus lens 102) to the front-focus position in step S202, the control unit 113 sets a time period to stop the movement of the focus position for the predetermined time period to wait for convergence of the evaluation value. The time period to stop the movement of the focus position is set so that the time period becomes longer as the intensity of the 3DNR processing becomes higher, as described above. For example, the time period to stop the movement of the focus position may be set based on table data depending on the set value set by the user, or may be calculated from the setting value, the number of frames used in the 3DNR processing, or the like. The time period to stop the movement of the focus position may be dynamically changed so that the evaluation value converges to a value within a predetermined range. Because a time period taken for the AF control becomes longer as the time period to stop the movement of the focus position becomes longer, the setting is made in consideration of this matter. For example, the user or a designer may set a permissible AF control time period, and an upper limit may be set to the time period to stop the movement of the focus position so that the AF control can be completed within the set time period. In other words, the upper limit may be set to the time period to stop the movement of the focus position depending on the permissible AF control time period.

Similarly, in step S403 after moving the focus position of the imaging optical system to the rear focus position in step S204, the control unit 113 sets the time period to stop the movement of the focus position to wait for convergence of the evaluation value. With the time period to stop the movement of the focus position at the time of wobbling driving, a change amount in evaluation value to be acquired in each of step S203 or step S205 becomes large, whereby the accuracy in determination of the in-focus direction increases.

In step 403 after moving the focus position to the peak position (target position) identified by the hill-climbing method, the control unit 113 sets the time period to stop the movement of the focus position. With this time period to stop the movement of the focus position, the control unit 113 can acquire a stable evaluation value in the wobbling method when the processing returns to step S201.

In step 405 after moving the focus position to the peak position identified by the hill-climbing method in step S214, the control unit 113 sets the time period to stop the movement of the focus position. This can prevent occurrence of a phenomenon in which the inversion of the direction of hill-climbing is repeated.

The time period to stop the movement of the focus position set in each of step S404 and step S405 is also set so that the time period becomes longer as the intensity of the 3DNR processing becomes higher basically similarly to that at the time of the wobbling (in steps S402 and S403). However, because this processing is not frequently executed in step S404 or step S405, there is no major influence on the time period taken for the AF control even if the time period to stop the movement of the focus position is set to be long to some extent. Thus, it is possible to set such a time period to stop the movement of the focus position as that allows the evaluation value to converge completely.

(Hardware Configuration)

Figure 5:
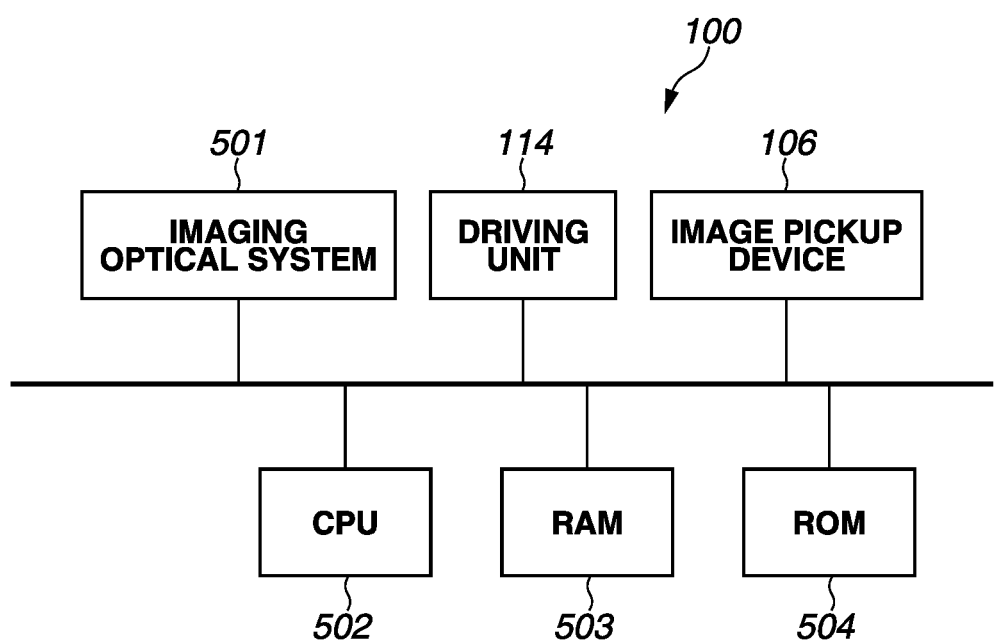
FIG. 5 is a diagram illustrating a hardware configuration of the imaging apparatus according to the first exemplary embodiment.

FIG. 5 is a diagram illustrating a hardware configuration example of the imaging apparatus 100 according to the present exemplary embodiment. The imaging apparatus 100 includes an imaging optical system 501, the driving unit 114, the image pickup device 106, a CPU 502, a random-access memory (RAM) 503, and a ROM 504. The driving unit 114 and the image pickup device 106 are identical to those illustrated in FIG. 1. The imaging optical system 501 includes at least the zoom lens 101, the focus lens 102, and the diaphragm unit 103, which are illustrated in FIG. 1.

The CPU 502 is a programmable processor for executing the AF control of the imaging apparatus 100 according to the present exemplary embodiment. Functions implemented by software among those of blocks illustrated in FIG. 1 (for example, the acquisition unit 112 and the control unit 113) are implemented by the CPU 502 loading a program stored in the ROM 504 or any other types of storage such as flash memories and executing the program using the RAM 503 as a work space. For example, a setting value indicating the intensity of the 3DNR processing, a time period to stop the movement of the focus position, and an increased driving amount in the wobbling are temporarily stored in the RAM 503.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-140388, filed Sep. 2, 2022, which is hereby incorporated by reference herein in its entirety.

What is claimed is:

1. An image capturing apparatus comprising:
an image sensor that captures an image of an object formed by an imaging optical system;
at least one processor; and
a memory coupled to the at least one processor, the memory storing instructions that, when executed by the at least one processor, cause the at least one processor to:
execute noise reduction processing on a first image captured by the image sensor based on a plurality of second images;

acquire an evaluation value indicating contrast of the first image on which the noise reduction processing has been executed; and control movement of a focus position of the imaging optical system based on the evaluation value, wherein the movement of the focus position is controlled so that the movement of the focus position is stopped for a time period having a length corresponding to an intensity of the noise reduction processing in a case where a predetermined condition is satisfied.

2. The image capturing apparatus according to claim 1, wherein the movement of the focus position is controlled so that the movement of the focus position is stopped for a longer time period as the intensity of the noise reduction processing becomes higher.

3. The image capturing apparatus according to claim 1, wherein the time period for which the movement of the focus position is stopped is determined based on the number of the plurality of second images used in the noise reduction processing.

4. The image capturing apparatus according to claim 1, wherein the predetermined condition includes at least one of (a) the focus position having reached a target position, (b) the target position having been changed, or (c) a driving direction to move the focus position having been reversed and wherein the movement of the focus position is controlled, the control being triggered by satisfaction of the predetermined condition, so that the movement of the focus position is stopped for the time period having the length corresponding to the intensity of the noise reduction processing.

5. The image capturing apparatus according to claim 1, wherein the instructions further cause the at least one processor to:

execute wobbling driving to move the focus position of the imaging optical system to a first position and a second position alternately;

acquire a change in the evaluation value at the focus position before the wobbling driving is executed at each of the first position and the second position; and determine a driving direction to move the focus position of the imaging optical system based on the change in the evaluation value.

6. The image capturing apparatus according to claim 1, wherein a driving amount of wobbling driving is determined based on the intensity of the noise reduction processing.

7. The image capturing apparatus according to claim 6, wherein the driving amount is determined so that the driving amount is increased as the intensity of the noise reduction processing becomes higher.

8. The image capturing apparatus according to claim 6, wherein the driving amount is determined based on the number of the plurality of second images used in the noise reduction processing.

9. A method for controlling an image capturing apparatus, the method comprising:

capturing an image of an object formed by an imaging optical system;

executing noise reduction processing on a captured first image based on a plurality of second images;

acquiring an evaluation value indicating contrast of the first image on which the noise reduction processing has been executed; and controlling movement of a focus position of the imaging optical system based on the evaluation value, wherein the movement of the focus position is controlled so that the movement of the focus position is stopped for a time period having a length corresponding to an intensity of the noise reduction processing in a case where a predetermined condition is satisfied.

10. The method according to claim 9, wherein the movement of the focus position is controlled so that the movement of the focus position is stopped for a longer time period as the intensity of the noise reduction processing becomes higher.

11. The method according to claim 9, wherein the time period for which the movement of the focus position is stopped is determined based on the number of the plurality of second images used in the noise reduction processing.

12. The method according to claim 9, wherein the predetermined condition includes at least one of (a) the focus position having reached a target position, (b) the target position having been changed, or (c) a driving direction to move the focus position having been reversed, and wherein the movement of the focus position is controlled, the control being triggered by satisfaction of the predetermined condition, so that the movement of the focus position is stopped for the time period having the length corresponding to the intensity of the noise reduction processing.

13. The method according to claim 9, the method further comprising:

executing wobbling driving to move the focus position of the imaging optical system to a first position and a second position alternately;

acquiring a change in the evaluation value at the focus position before the wobbling driving is executed at each of the first position and the second position; and determining a driving direction to move the focus position of the imaging optical system based on the change in the evaluation value.

14. The method according to claim 9, wherein a driving amount of wobbling driving is determined based on the intensity of the noise reduction processing.

15. The method according to claim 14, wherein the driving amount is determined so that the driving amount is increased as the intensity of the noise reduction processing becomes higher.

16. The method according to claim 14, wherein the driving amount is determined based on the number of the plurality of second images used in the noise reduction processing.

17. A non-transitory computer-readable storage medium storing a program for causing a computer to execute a method comprising:

capturing an image of an object formed by an imaging optical system;

executing noise reduction processing on a captured first image based on a plurality of second images;

acquiring an evaluation value indicating contrast of the first image on which the noise reduction processing has been executed; and controlling movement of a focus position of the imaging optical system based on the evaluation value, wherein the movement of the focus position is controlled so that the movement of the focus position is stopped for a time period having a length corresponding to an intensity of the noise reduction processing in a case where a predetermined condition is satisfied.

* * * * *